United States Patent [19]
Ruckel

[11] Patent Number: 4,727,754
[45] Date of Patent: Mar. 1, 1988

[54] ELECTROMAGNETIC FLOWMETER

[75] Inventor: Johannes Ruckel, Munich, Fed. Rep. of Germany

[73] Assignee: Klaus Thurau, Fed. Rep. of Germany

[21] Appl. No.: 898,483

[22] Filed: Aug. 21, 1986

[30] Foreign Application Priority Data

Aug. 22, 1985 [DE] Fed. Rep. of Germany ....... 3530055

[51] Int. Cl.4 .................................. G01F 1/58
[52] U.S. Cl. ................... 73/861.12; 128/691
[58] Field of Search ........... 73/861.12, 861.13, 861.16, 73/861.17; 128/691

[56] References Cited

U.S. PATENT DOCUMENTS

| 3,309,924 | 3/1967 | Kolin et al. | 73/861.12 |
| 4,409,846 | 10/1983 | Ueno | 73/861.17 |
| 4,601,209 | 7/1986 | Amata | 73/861.17 |

FOREIGN PATENT DOCUMENTS 1923071 11/1969 Fed. Rep. of Germany .
0037520 3/1983 Japan ................. 73/861.17

OTHER PUBLICATIONS

"Transducers For Biomedical Measurements: Principles and Applications," Cobbold, 1974 pp. 244–315.

Primary Examiner—Charles A. Ruehl
Attorney, Agent, or Firm—Hill, Van Santen, Steadman & Simpson

[57] ABSTRACT

A probe for an electromagnetic flowmeter in miniaturized format, particularly for blood flow measurements, has two magnetic coils which are oppositely wound on a toroidal core of permanent magnetic material. Two electrodes respectively connected to the coils are disposed inside the core. The core has a layer structure of extremely thin wafers of material having high magnetic resonance and thin insulating layers in alternation. For re-magnetization of the core, the coils are charged with extremely brief and high current pulses. The measured signal is taken when the pulsed current for magnetization of the coils has decayed.

8 Claims, 6 Drawing Figures

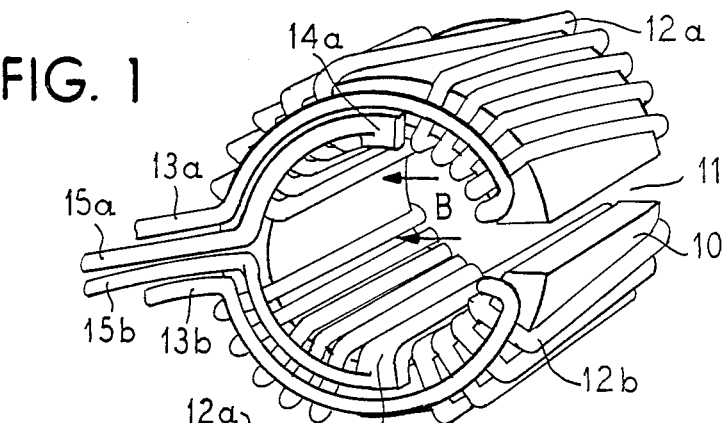
FIG. 1
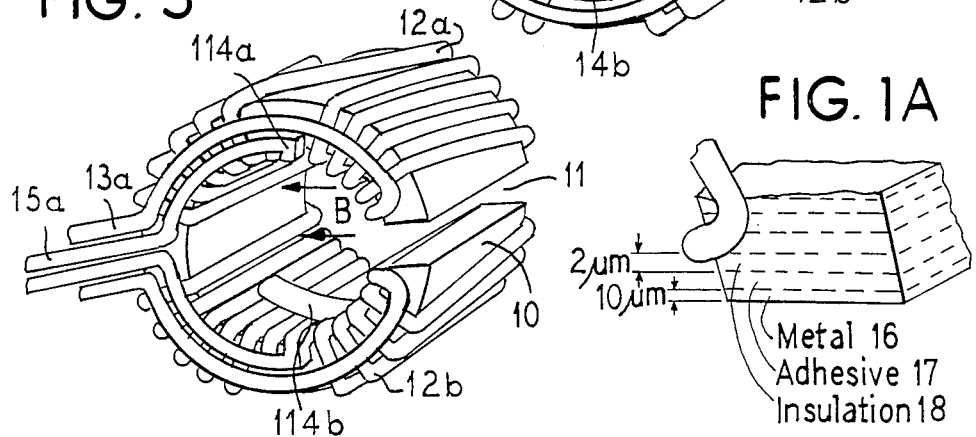
FIG. 5
FIG. 1A
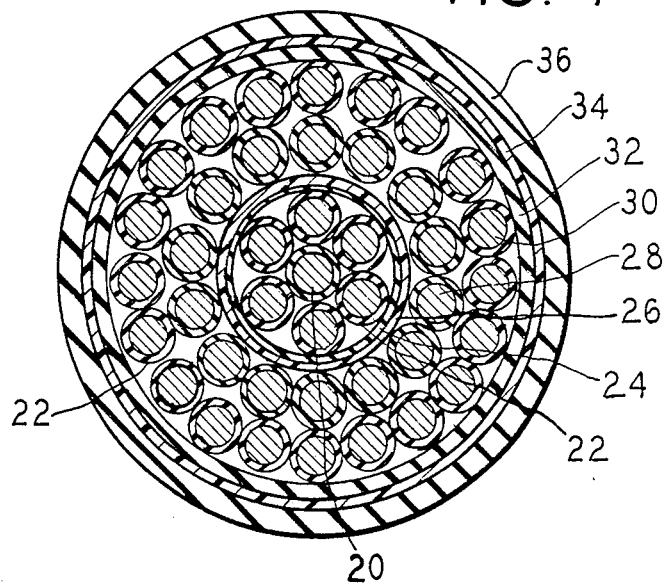
FIG. 4

ELECTROMAGNETIC FLOWMETER

BACKGROUND OF THE INVENTION

1. Field of the Invention

The invention relates to an electromagnetic flowmeter particularly for in vivo measurement of blood flow quantities.

2. Description of the Prior Art

Electromagnetic flow measurement makes use of the electrical voltage which arises when a flowing fluid having charge carriers is brought into a magnetic field oriented perpendicularly to the flow direction. The resulting electrical field and, thus, the electrical voltage is then perpendicular to the plane which is defined by the flow direction and by the magnetic field and can be monitored with suitable electrodes and supplied to evaluation circuits. The generated voltage is thereby proportional to the flow rate, i.e. to the volume of fluid which flows through the cross-section of the fluid conductor per second.

This measuring principal proves superior for physiological examinations of blood flows in practice: the measuring method does not influence the flow, rapidly changing flows can be identified, the measuring probes are relatively small and can be implanted at blood vessels for longer measurements, they require no damage to the blood vessel, the measured signal is largely independent of the flow profile and of the physical properties of the blood, and fast changes of the blood flow can also be acquired. Examples of such probes are disclosed, for example, in the book "Transducers For Biomedical Measurement" by R. S. C. Cobbold which was published by J. Wiley in 1974. These probes differ from one another on the basis of the manner in which the magnetic field to be applied perpendicularly to the axis of the blood vessel is generated. Such a probe or such a flow-through measuring means is also known from German OS No. 1923071. All of these known probe forms have in common the use of magnetic coils with or without a low-retentivity (ferromagnetic) core member are employed, these generating an alternating magnetic field having a frequency of about 400 Hz and above (measuring errors as a consequence of electro-chemical polarization processes at the electrodes are thereby largely avoided). For smaller blood vessels, C-shaped or U-shaped magnetic coils are employed or coils which contain a toroidal, low-retentivity body whose two legs are charged with magnetic coils having opposite winding direction, so that a magnetic field arises in the inside of the toroidal member.

These known probes for electromagnetic blood flow measurement, however, still exhibit a number of disadvantages: they do not supply an adequately high measured signal given extremely small blood vessels, the excitation methods presently employed for the alternating magnetic field lead to disturbances of the measured signal, the datum line balancing is difficult, the dimensions of the probe are still too large for many implantation purposes, and the mechanical and electrical stability of the diverting cable from the probe to the outside of the body still leaves something to be desired.

For physical reasons, these disadvantages cannot be eliminated by improving the known probe forms. A miniaturization of the probe given the same excitation current for generating the magnetic field leads to an increase of the stray power since this is proportional to the reciprocal of the coil cross section. Given implanted probes, however, high local heating cannot be accepted. Given measurements at small blood vessels having a correspondingly small flow quantity, on the other hand, a boost of the magnetic field is required since the measured signal is proportional to the flow stream. A higher coil current, however, leads to a greater, unacceptable increase of the stray power which rises proportional to the square or the coil current.

Disturbances of the measured signal due to interaction with the coil current which also flows during the measurement probes are likewise difficult to govern given small probes having closely adjacent conductors. For electromagnetic flowmeters which are employed outside of the biological-medical field, German OS No. 30 29 791 has proposed that a permanent magnet which is periodically remagnetized be employed instead of a magnetic yoke with low-retentivity material. The measurement of the electrical flux signal is carried out in those time segments in which no remagnetization current is flowing. The measurement head probes therein, however, have extremely large dimensions and cannot be used for implantation purposes; moreover, it cannot be operated with the frequencies of about 400 Hz required for blood flow measurements since high eddy currents arise in the permanent magnet material at these frequencies. The generation of thermal energy connected therewith would heat the measuring probe to a temperature which would be unacceptable for a physiological blood flowmeter. The permanent magnet materials proposed therein, moreover, do not have a rectangular hysteresis loop as required for a measuring probe of the species proposed here. The inductivity of the coil with a magnetic core likewise hardly allows the required edge steepness of, for example, $5 \cdot 10^7$ A/sec due to its large current pulses.

Due to the solid execution of the permanent-magnetic pole members, a physical effect which has an extremely disadvantageous influence arises. Different hysteresis loops are traversed in the volume material of the permanent-magnetic, solid pole members in different depths because the cructial magnetic field penetrates relatively slowly into the volume material, this being caused by the unavoidable self-induction. The currents induced by the self-induction also attenuate the penetrating field. It follows therefrom that, due to the relatively long relaxation time of the magnet, a magnetic field which is truly chronologically constant is never obtained. Noise effects which deteriorate the ratio of noise signal to useful signal, i.e. the signal-to-noise ratio, are superimposed on the measurement.

The relatively long relaxation time of the solid permanent magnet during the switch-over phase triggers cross-talk voltages in the measuring line as well as induced voltages on the line for the supply voltage, making the zero point of the measurement unstable from synchronous voltages.

SUMMARY OF THE INVENTION

An object of the present invention is to provide an electromagnetic flowmeter of the type described above having a probe with extremely small dimensions, for example, an outside diameter of approximately 2 mm.

Another object of the present invention is to provide such a probe which supplies a high output signal with low stray power.

A further object is to provide a probe of this type which is capable of being easily implanted in life forms for physiological blood flow measurement.

Another object is to provide such a probe which can remain in place in life forms for extended periods of time without discomfort or other pathological effects.

A further object of the present invention is to provide a method for manufacturing such a probe.

A further object of the present invention is to describe a method for operating a probe of the type disclosed herein.

The above objects are achieved in accordance with the principles of the present invention in a probe for an electromagnetic flowmeter having a toroidal or C-shaped member having a sandwich structure of extremely thin laminae of a permanent magnetic material and foils arranged therebetween for electrical insulation. The coil core is provided with an electrical coil or with two sub-coils having only a few winding and can have its magnetic polarity periodically changed by applying brief, extremely high current pulses. As a result thereof, a strong, permanent magnetic field which is periodically re-magnetized thereby arises in the inside of the toroidal magnetic member or in the slot of the C-shaped magnet member in which the fluid conductor or, respectively, the blood vessel is arranged during the measurement. Since the re-magnetization ensues due to extremely short current pulses, but the magnetic field is also maintained over arbitrarily long time durations even without excitation current, the measurement of the electrical signal can ensue given currentless coils and, thus, without any electrical disturbance (cross-talk). A special microcable is employed for the power supply to the coils and for carrying the measured signal.

Since the strong magnetic field is supplied by a permanent magnet, large coils are not required as would be required given the same magnetic field in conventional coils having a low-retentivity core. The volume of the re-magnetization coils required herein can be kept extremely small since these are only charged in pulsed mode and thus do not require any thick conductors for longer loading. In this way, the overall volume of the probe can be reduced by orders of magnitude in comparison to conventional electromagnetic blood flow measuring probes (typical, known coils have dimensions of 8×3×5 mm and a weight of about 600 mg, whereas the proposed probe has an outside diameter of about 1.5 mm and a weight of about 4–5 mg). The probe can thus be employed without difficulty even in extremely small blood vessels having diameters of up to 0.8 mm. As a consequence of the pulse-like current, the thermal load of the probe is likewise extremely low and leads to no stressing of the tissue when the probe is implanted.

As a consequence of the strong magnetic field available, the measured signal is available with good signal-to-noise ratio even given small flows.

An exemplary embodiment of the invention shall now be set forth in greater detail with reference to drawings.

DESCRIPTION OF THE DRAWINGS

FIG. 1 is a perspective view of a probe for electromagnetic flow measurements constructed in accordance with the principles of the present invention.

FIG. 1A is an enlarged fragmentary view showing the layered structure of the core member of the probe of FIG. 1.

FIG. 4 is a cross-section through a connecting cable constructed in accordance with the principles of the present invention.

FIG. 5 is a probe of FIG. 1 having transverse line electrodes.

DESCRIPTION OF THE PREFERRED EMBODIMENTS

FIG. 1 shows the fundamental structure of a probe for electromagnetic flow measurements in the form of a cylinder in whose interior the fluid conductor or blood vessel (not shown) proceeds coaxially. The probe has a magnetic core 10 in the form of a torus which is open at one location by a slot 11. Two coils 12a and 12b are wound in opposite directions on the magnetic core at both sides of the slot 11, these coils 12a and 12b being connected to respective common connecting lines 13a and 13b. The permanently magnetized magnetic core 10 generates a magnetic field in the inside of the coil member which proceeds perpendicularly to the coil axis (referenced B in FIG. 1). Two electrodes 14a and 14b which are connected to measured signal lines 15a and 15b lie above and below the plane defined by the slot 11 and the coil axis. In the measurement, these electrodes lie against the outside wall of the blood vessel which is introduced into the interior of the cylinder through the slot 11. An opening of the blood vessel, thus, is not required given this type of measurement.

Although not shown, the measuring probe can also have a C-shaped core for especially small blood vessels, whereby the blood vessel is arranged in the air gap. In this case, the coil is continuously permeated by current in the same directional sense. Although the volume ratio becomes somewhat less favorable as a consequence of this structure, a significantly greater magnetic field is obtained in the magnetic core slot, so that a measurement at such small blood vessels becomes possible at all for the first time. Given this structure, magnetic fields of about 1 Tesla can be generated.

Figure 2:
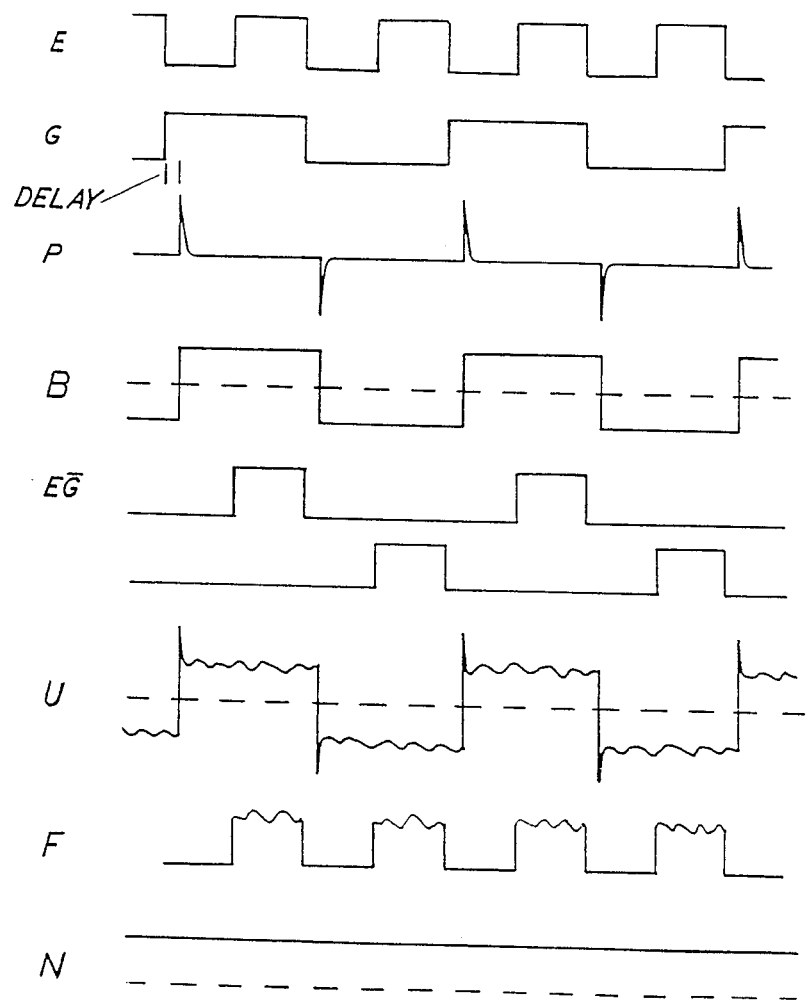
FIG. 2 is a time diagram of the current and measured pulses for operation of the probe of FIG. 1.

The functioning of the probe of FIG. 1 shall now be set forth in greater detail with reference to the pulse-time diagram of FIG. 2. At the beginning of the measurement, let the coils 12a and 12b be assumed to be currentless, so that the magnetic field B prevails in the inside of the toroidal member. Due to the flow of the fluid, electrically charged particles (ions or electrons) are deflected up or down in this magnetic field and generate an electrical field which can be picked up the electrodes 14a and 14b. Since polarization effects due to ion migrations to the electrodes occur after a short time given ion conductors, as in the case of blood, the measuring direction must be reversed. For this purpose, the coils 12a and 12b are periodically charged with extremely short but very high pulsed currents P, for example on the order of magnitude of 30 Amperes for one microsecond, whereby the direction of the magnetic field B is reversed as a consequence of the opposite winding of the coils. Such pulsed currents can be supplied by discharge capacitors which are charged and briefly discharged in a known way via push-pull circuits. As a result of the field reversal, the polarity of the measured signal U at the electrodes 14a and 14b also changes, this being supplied to the input of an amplifier (not shown). In the diagram of FIG. 2, the pulsed currents are referenced P. It has thereby been assumed that the flow rate does not change and, thus, that the absolute amount of the measured signal U likewise remains the same. The sensing of the measured signal U supplied to the said amplifier as amplifier input signal via the measuring lines 15a and 15b ensues with appropriate gating pulses EG and $\overline{EG}$ for the following evaluation electronics at points in time at which it is assured that current is no longer present in the coils 12a and 12b and the magnetic field B now exists only on the basis of the permanent magnetization of the magnetic core 10. This magnetic field B is chronologically exactly constant and therefore provides no occasion for measuring errors as in the probes known from the prior art, in which changes of the coil current lead to corresponding changes of the magnetic field. The measured signal U sampled and demodulated during the gating pulses EG and $\overline{EG}$ is available as signal F and is integrated. The integrated signal is supplied as output signal N which is shown as constant signal in FIG. 2 in accord with the flow stream assumed to be constant.

The gating pulses EG and $\overline{EG}$ are generated from two periodic pulse sequences E and G in accord with FIG. 2, by logic elements in a known way; with a delay$\Delta$. The signal edges of the pulse sequence G continue to control the triggering of the pulsed currents P serving for re-magnetization.

Since the constant magnetic fields are available over time spans of nearly arbitrary length, the sampling frequency for the measured values at the electrodes has no limits. The measured values can therefore be freely sampled in accord with the optimum conditions of the overall system. In the measurement of the blood flow, therefore, a reduction of the sampling frequency to relatively low frequencies of a few Hertz, for example 150 Hz or even to 1 Hz is possible in order to even further reduce the thermal load on the blood vessels. The possibility is thus available to use even higher pulsed currents, since the stray power is so low given the low-remagnetization frequencies that higher pulsed current drives are possible without thermally loading the tissue.

Since the coils 12a and 12b are only intended to effect re-magnetization of the permanently magnetized core 10 and do not generate the measuring field itself, they only have to be composed of a few windings, on the order of about 10 windings, this also reducing the self-induction of the arrangement and, thus, enabling a faster current rise for the re-magnetization. As a result thereof and of the employment of thin electrical conductors chargable only in pulsed mode, the dimensions of the coils are so small that the overall diameter of the measuring probe of FIG. 1 itself is only slightly greater than the diameter of the blood vessel which the probe surrounds (for example 1.5 mm for a blood vessel diameter of 0.8 mm). The core thereby preferably has a thin cylindrical form having a length of about 100 $\mu$m through 2000 $\mu$m.

Permanent magnetic materials which may be used in the probe disclosed herein must have a high residual flux density (for example $B_R \approx 1.25$ Ts) in order to be able to generate the strong magnetic field required. Further, they should not have excessively high values for the coercive field strength (for example $H_c \approx 55$ KA/mkg) so that the thermal re-magnetization losses do not become excessively high, i.e., they should achieve an optimally high magnetic energy density $(B \times H_{max})$ given an optimally low coercive field strength. Such magnetic materials have what is referred to as a rectangular hysteresis loop. The magnetic properties desired here are supplied by materials, for example AlNiCo alloys, which have a metallic conductivity but, as a result, also exhibit undesireably high eddy current losses given fast re-magnetization. Further, the eddy currents prevent the re-magnetizing field from penetrating into the magnetic core 10 and thus prevent complete re-polarization of the core 10.

In order to resolve this problem, the present invention does not employ a magnetic core 10 of solid permanent magnetic material but employs a magnetic core having a layer structure in which extremely thin wafers of a permanent magnetic material having the desired hysteresis curve are stacked in alternation with electrically insulating layers or foils. Given the operating conditions described above, the layers of the permanent magnetic material must have a thickness of about 10 $\mu$m.

For the manufacture of the permanent-magnetic, layered coil cores for the probes of the invention, the thinnest possible wafers are sawn from rod-shaped magnetic material in a first step. Given the magnetic properties required here (high remanence), only sintered alloys generally come into consideration, these being extremely brittle so that wafers less than 1 mm thick can not be obtained when sawing.

The layer thicknesses of about 10 $\mu$m required here for the suppression of eddy currents can be produced from these wafers by means of careful lapping. Surprisingly, the magnetic properties of the material are not lost given this highly stressing, mechanical processing. The magnetic wafers 16, shown in FIG. 1A (not to scale), which are already flexible given these low thicknesses, are stacked on top of one another in a further manufacturing step with correspondingly tailored laminae 17 of an insulating foil, for example of polycarbonate, having a thickness of about 2 $\mu$m. The wafers 16 and foils 17 are stacked in alternation with an adhesive 18, for example epoxy resin.

The stack which has arisen is then fixed by wrapping with fine wire or threads so that it can be bent around a round template before the adhesive hardens, the diameter of this template being selected in accord with the desired final dimensions of the coil core. When the adhesive has thoroughly hardened in this condition, the fixing threads can be removed for subsequent processing of the core, such as, for example, grinding. Typical dimensions of the finished coil member are then:

Outside Diameter: about 1.35 mm
Thickness in Radial Direction: about 0.2 mm
Clear Inside Diameter: about 0.95 mm.

The low power consumption of probes of the invention and obtaining the measured signal only outside of the re-magnetization times also enable the employment of extremely thin and flexible connecting cables. Since, in blood measurements, these cables must often be implanted in living tissue over longer time spans, for example several months, high demands are made on their mechanical stability, flexibility, chemical resistance and compatability with tissue. Particularly high demands are made on the resistance to moisture, i.e. of the chemical resistance of the cables, because the potassium, sodium and hydrogen ions present in the extra-cellular tissue fluid form extremely reactive electrolytes and hydrolytes. The insulation must therefore guarantee a tight barrier against moisture. The particularly high flexibility of the cables is required because the blood vessels are extremely ductile and the danger of snapping exists. This not only causes a falsification of the measured results, but also the risk of damage to the vessels. There is no known material which meets all of these demands. It was found, however, that a cable which satisfies the required properties can be manufactured simply by a combination of Teflon ® and silicone. Given the employment of Teflon ® alone, which enters into a very firm connection to the metallic surface of the stranded wires when applied, cables insulated only with Teflon ® are too stiff. On the other hand, Teflon ® has the property that even the thinnest walled Teflon ® hoses make a tight barrier to moisture. In order to also guarantee the required flexibility of the cable, the individual stranded wires are first coated with silicone, so that the Teflon ® layer no longer comes into direct contact with the metal of the stranded wires.

A cable which meets these demands and which corresponds to the structure shown in FIG. 4 can be manufactured in the following way using silver wires on the order of magnitude of about 20 μm in diameter.

The silver wires are first coated by immersion with a silicone layer 22 about 2 through 4 μm thick. Six further wires are circularly wound around a central wire 20 so that a first strand having a diameter of about 70 μm arises. This first strand is again coated with a thin silicone layer 24 and is subsequently drawn into a Teflon ® hose 26. The inner strand is thereby finished, having a diameter of about 110 μm. After the materials have hardened, a second course 28 of silver wires is circularly wound onto the Teflon ® hose 26 of the inner strand, whereby each individual wire is again silicone-coated and has a diameter of about 25 through 35 μm. A third conductor course 30 is circularly wound over this second course 28 in the same direction and at a somewhat greater pitch, whereby every individual silver wire is again coated with silicone and likewise has a diameter of about 25 through 35 μm. After the second strand composed of the second and third courses has been applied, the conductor bundle is again coated with a silicone layer 32 and is drawn into a Teflon ® hose 34. In this condition, the cable has a diameter of about on the order of magnitude of 0.3 mm. A further layer 36 of about 0.1 to 0.2 mm silicone is applied for the mechanical protection of the outer Teflon ® hose 34 which, as a consequence of its low thickness, is extremely sensitive. The finished cable has a thickness of about 0.5 through 0.6 mm, maximally 0.7 mm and exhibits extremely high, stable flexibility as well as chemical resistance to the tissue fluid.

In addition to the embodiment of the coil for the measuring probe shown in FIG. 1, having longitudinal electrodes, other electrode configurations also come into consideration, these being matched to the distribution of the magnetic field in the probe cavity (measuring lumen) and supplying signals with a lower measuring error for special measuring tasks. With respect to the electrode design, it is to be fundamentally assumed that the line integral should be equal to zero along B×j, namely for arbitrarily drawn circular loops in the probe cavity. J is the current field in the probe cavity when a voltage is applied to the electrodes from the outside via the feed lines and the magnetic field is switched off. This can be achieved not only with an illustrated longitudinal electrode but can also be achieved with transverse line electrodes 114a and 114b as shown in FIG. 5 or can be achieved in a particularly optimum way with a plurality of punctiform electrodes (each having its own feed line) which are arranged in accord with the transverse line electrodes. Lying opposite one another, such transverse line electrodes proceed over an angular range of respectively 45° through 90° in a plane perpendicular to the direction of blood flow.

Figure 3:
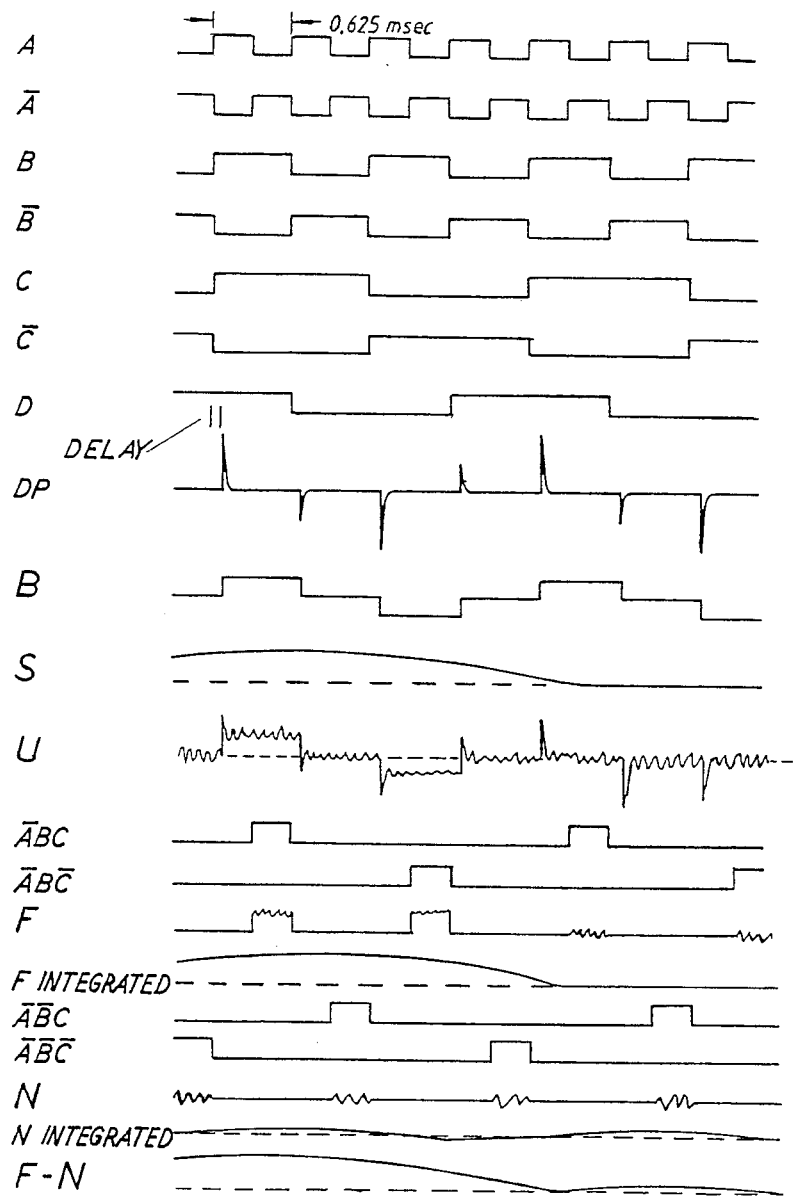
FIG. 3 is a time diagram of the current and measured pulses for another type of signal evaluation.

FIG. 3 shows a preferred pulse diagram for the operation of the measuring probe and for the drive of the coil given chronologically variable flow streams S. The magnetic field B present in the coil is not directly switched between the extreme values +B and −B, but is switched via an intermediate step B=0 with every second re-magnetization pulse DP having a smaller value impressed thereon. The measured signal, i.e. the sampled and demodulated signal F, as in the case of FIG. 2, is again derived from the amplifier input signal U by means of gating pulses $\overline{ABC}$ and $\overline{ABC}$ and is subsequently integrated. In addition, however, a signal N is also generated in the same way from the amplifier input signal U during the intermediate steps with the magnetic field B=0, by means of the gating pulses ABC and ABC. This signal N, obtained by sampling and demodulating the signal U, i.e. the amplifier input signal, defines the datum line of the measurement and is subtracted from the measured signal F in order to eliminate chronological changes in the measuring device. The signal F-N is thus obtained. The chronological control of the individual events ensues by means of a series of periodic pulse sequences A, $\overline{A}$, B, $\overline{B}$, C, $\overline{C}$ and D with a respectively halved frequency which are employed in a known logic element system in order to generate the gating pulses.

The electronic circuits for the representation of the pulse sequences and for generating the gating pulses as well as for the amplification and the processing of the measured signals in accord with FIGS. 2 and 3 can be easily produced with known standard components and are known from electronic pulse technology.

Although the flow measurement is particularly designed for physiological identification of the flow rate of blood in blood vessels, the principle which has been set forth and the described measures can be utilized for flow rate identification of any fluid in vessels and small-diameter tubes.

Although modifications and changes may be suggested by those skilled in the art it is the intention of the inventor to embody within the patent warranted hereon all changes and modifications as reasonably and properly come within the scope of their contribution to the art.

I claim as my invention:
1. A probe for an electromagnetic flowmeter for measuring the flow rate of fluid in a conduit comprising:
   an annular core which can be placed around said conduit consisting of a plurality of alternating sheets of permanent magnetic material having a thickness of 10 μm and sheets of insulating material;
   a coil wound around said core for generating a magnetic field extending transversely to the direction of flow of said fluid in said conduit upon electrical excitation of said coil, said coil having two oppositely wound coil sections;
   two electrodes disposed opposite each other on the interior of said core; and
   an electrode lead for each of said electrodes extending perpendicularly to said direction of flow and having a diameter of less than 0.8 mm.

2. A probe as claimed in claim 1, wherein said conduit is a blood vessel.

3. A probe as claimed in claim 1, wherein said core has an outside diameter in the range of about 1 mm through about 1.5 mm.

4. A probe as claimed in claim 1, wherein said core with said coil wound thereabout has a clear inside diameter of approximately 0.95 mm.

5. A probe as claimed in claim 1, wherein said coil consists of approximately 10 windings and wherein said coil is an electrical conductor having a diameter in the range of about 0.04 mm through about 0.07 mm.

6. A probe as claimed in claim 1, wherein at least the surface of said core consists of AlNiCo alloy.

7. A probe as claimed in claim 1, wherein each electrode lead comprises:
  a central strand consisting of a plurality of individual stranded conductors each having a diameter of approximately 20 μm and each having a silicone coating;
  a silicone coating covering said central strand;
  a Teflon ® tube surrounding said silicone coating of said central strand;
  a first course of a plurality of individual conductors each having a silicone coating wound around said Teflon ® tube;
  a second course of a plurality of individual conductors each having a silicone coating wound around said first course;
  a silicone coating covering said second course;
  a further Teflon ® tube covering said silicone coating over said second course; and
  an outer silicone layer covering said further Teflon ® tube.

8. A probe as claimed in claim 7, wherein each of said individual conductors in said central strand, said first course and said second course consist of silver.

* * * * *